United States Patent
Stütz

[11] Patent Number: 5,957,487
[45] Date of Patent: Sep. 28, 1999

[54] LATERAL IMPACT PROTECTIVE DEVICE FOR VEHICLE OCCUPANTS

[75] Inventor: Michael Stütz, Spraitbach, Germany

[73] Assignee: TRW Occupant Restraint Systems GmbH, Alfdorf, Germany

[21] Appl. No.: 08/820,929

[22] Filed: Mar. 19, 1997

[30] Foreign Application Priority Data

Mar. 29, 1996 [DE] Germany ............................. 296 05 896

[51] Int. Cl.⁶ .................................................. B60R 21/22
[52] U.S. Cl. .......................................................... 280/730.2
[58] Field of Search ............................. 280/730.1, 730.2

[56] References Cited

U.S. PATENT DOCUMENTS

| | | | |
|---|---|---|---|
| 2,834,606 | 5/1958 | Bertrand | 280/730.1 |
| 5,788,270 | 8/1998 | HÅland et al. | 280/730.2 |

FOREIGN PATENT DOCUMENTS

| | | |
|---|---|---|
| 3422263 | 12/1985 | Germany . |
| 4307175 | 9/1993 | Germany . |
| 4166451 | 6/1992 | Japan . |
| 2278812 | 12/1994 | United Kingdom . |
| 9419215 | 9/1994 | WIPO . |

*Primary Examiner*—Kenneth R. Rice
*Attorney, Agent, or Firm*—Tarolli, Sundheim, Covell, Tummino & Szabo

[57] ABSTRACT

A lateral impact protective device for a front and a rear vehicle occupant comprises an elongated head gas bag which is convertable from a folded state to an inflated state. The gas bag has two opposite lateral ends and is adapted to extend, in the inflated state, from sidewards of said front vehicle occupant as far as sidewards of said rear vehicle occupant. The lateral protective device provides a common and, therefore, low-price protection for the front and the rear vehicle occupant.

37 Claims, 2 Drawing Sheets

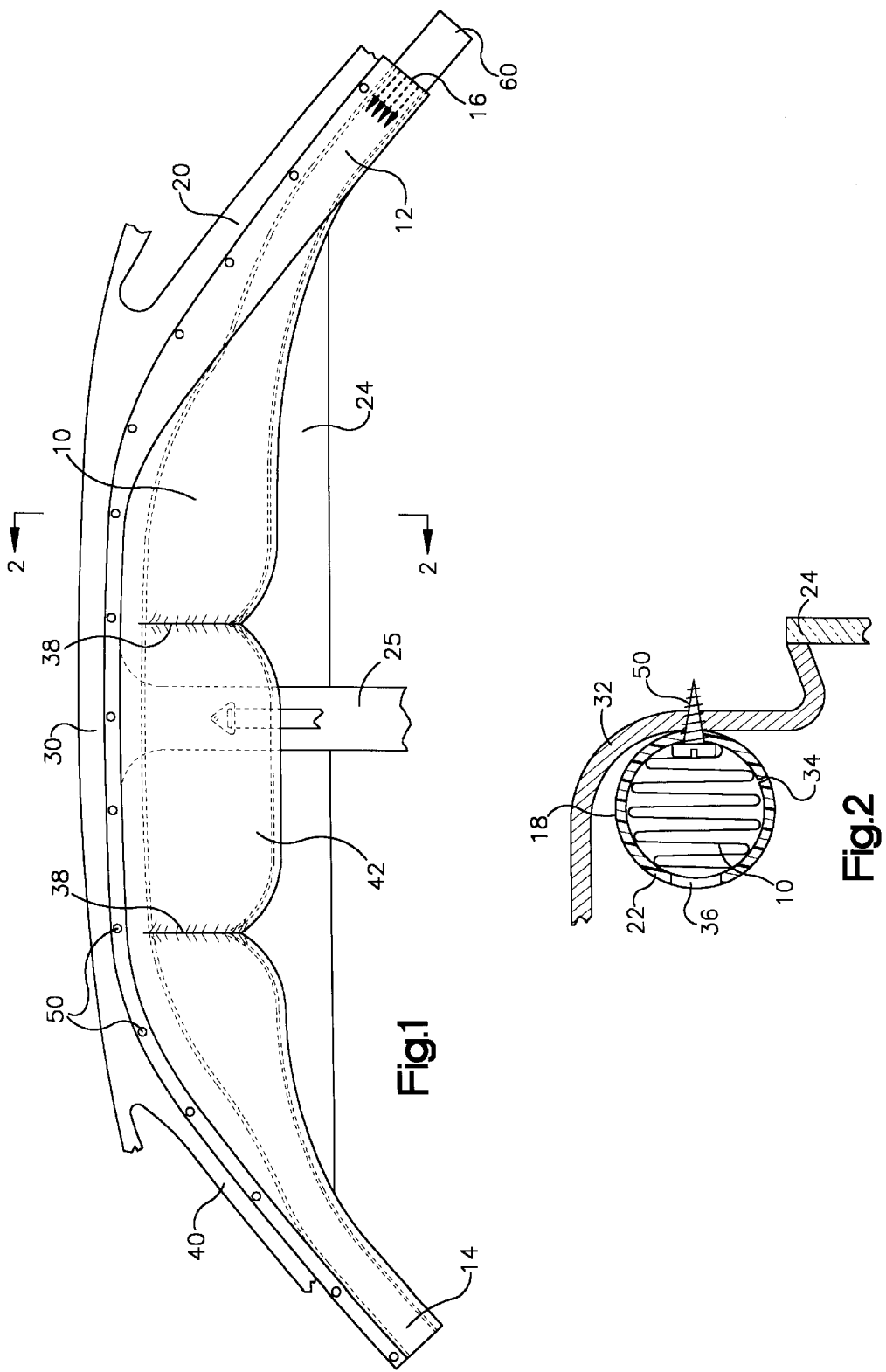

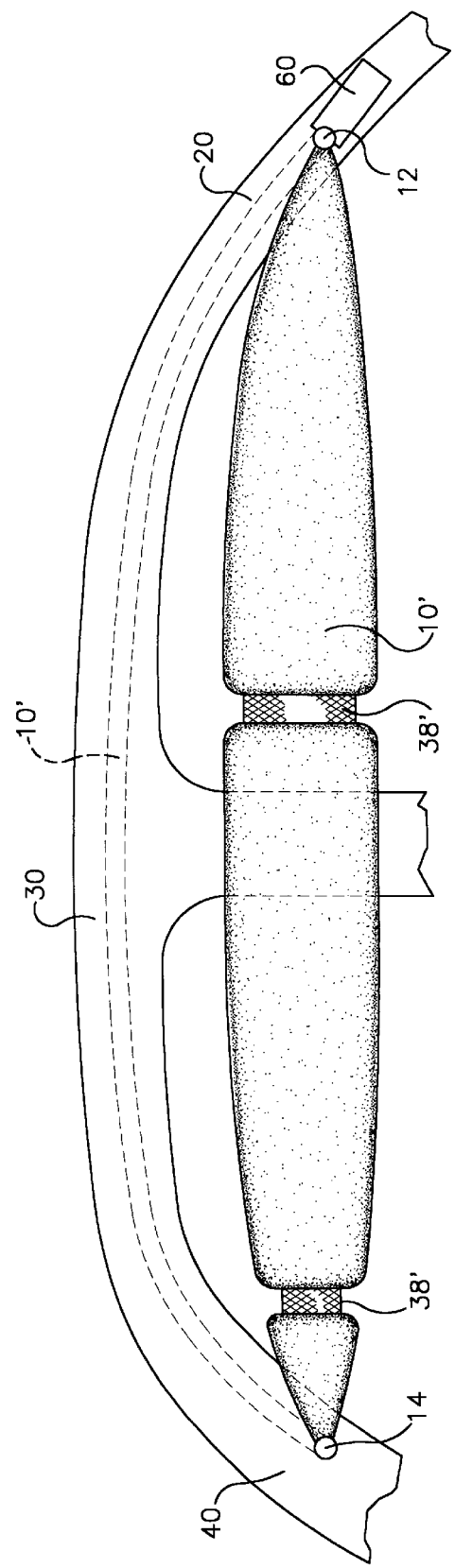

LATERAL IMPACT PROTECTIVE DEVICE FOR VEHICLE OCCUPANTS

TECHNICAL FIELD

The invention relates to a lateral impact protective device for vehicle occupants.

BACKGROUND OF THE INVENTION

A lateral impact protective device which comprises a head gas bag is disclosed in the patent publication WO 94/19215. The head gas bag described in this printed publication is designed in the form of a flexible hose and at its lateral ends is attached to the A-pillar and to the B-pillar. In the folded up condition, the gas bag extends under a covering along the A-pillar over the roof frame as far as the B-pillar. Since the gas bag is manufactured of a special purpose fabric, it's length is substantialy shortened during inflation. In the completely inflated state, the gas bag essentially extends linearly from the A-pillar as far as the B-pillar and prevents the head of a vehicle occupant striking the side window of the vehicle.

BRIEF SUMMARY OF THE INVENTION

The invention provides a simple lateral impact protective device which is suitable for front and rear vehicle occupants. According to the invention, the lateral impact protective device comprises an elongated head gas bag which is convertable from a folded state to an inflated state. The gas bag has two opposite lateral ends and is adapted to extend, in the inflated state, from sidewards of the front vehicle occupant as far as sidewards of the rear vehicle occupant.

The lateral impact gas bag protective device of the invention has a common head gas bag for the front vehicle occupant and the rear vehicle occupant and constitutes a simply installed, low-price protective device, in the case of which just as few parts must be installed in the vehicle as, for example, in the case of the known head gas bag for the front occupant.

In the installed, folded up condition the head gas bag, as a first embodiment thereof, preferably extends along at least a part of the A-pillar, then along the roof frame and along at least a part of the C-pillar of a vehicle. In the longitudinal direction, the head gas bag is non-folded and only has to unfold in the transverse direction so that the inflation process may take place rapidly.

There is the further provision that the inflated head gas bag extends from the A-pillar to the C-pillar and preferably is attached at its opposite ends on the one hand to the A-pillar and on the other hand to the C-pillar. The head gas bag extends, in the inflated state thereof like a flexible hose or cushion along the side windows from the A- to the C-pillar so that, independently of their sitting positions, the front and rear vehicle occupants will be afforded protection against lateral impact.

In accordance with a second embodiment, the head gas bag is not secured only on the A- and C-pillars, but, furthermore, along its upper edge to the roof frame. In this embodiment, the inflated gas bag, consequently, is not only supported on its two ends, but also along the upper edge on the vehicle and hence has greater stability.

The head gas bag can be connected with gas generators, mounted on the A- and/or the C-pillar via suitable gas outlet ports at its corresponding ends.

For simpler fitting in place in its folded state, the head gas bag is preferably arranged in a flexible hose-like fitting sheath which can be directly attached to the vehicle without requiring further fixtures. The head gas bag is additionally secured to the vehicle along its edge which is to the top of the head gas bag in the inflated condition thereof.

In accordance with a further embodiment, the lateral impact protective device is designed in the form of a unit able to be retrofitted to a vehicle, the fitting sheath then being preferably manufactured of a flexible material adapting itself to the shape of the vehicle.

The length of the head gas bag, in the inflated state thereof, is less than in the folded state, in which it is installed in the form of an arc along A-pillar, over the roof frame and as far as the C-pillar. Owing to the shortening in length during inflation the head gas bag is drawn taut between its points of attachment after it has emerged from the flexible fitting sheath. The reduction in length may on the one hand be caused by the use of a special purpose fabric, as is described in the said patent publication WO 94/19215 or on the other hand by the provision of at least one element adapted to constrict the head gas bag in the inflated condition, such element extending transverse to the longitudinal direction thereof. The constricting element is preferably attached to the head gas bag and is designed in the form of a string or tape. It can, however, also be attached to the vehicle.

Furthermore there may be a provision such that in the interior of the gas bag a heat resistant foil is present resting against the inner wall surface of the gas bag, such foil being so arranged and of such a size that, in the inflated state of the head gas bag, it is not loaded by pulling forces. This foil does not take up any forces and only exercises a sealing function so that the head gas bag remains completely inflated for several seconds and also provides a protective effect should the vehicle turn over.

BRIEF DESCRIPTION OF THE DRAWINGS

FIG. 1 shows a diagrammatic side elevation of a first embodiment of the lateral impact protective device of the invention with an inflated head gas bag.

FIG. 2 shows a section taken on the line A—A of FIG. 1 through a roof frame with the installed, folded up head gas bag.

FIG. 3 is a diagrammatic lateral elevation of a second embodiment of the lateral impact protective device of the invention including a sheath-like head gas bag in the inflated state.

DETAILED DESCRIPTION OF A PREFERRED EMBODIMENT

In FIG. 1 the reader will see a lateral impact protective device having a head gas bag 10 designed to offer lateral impact protection both for a front occupant and also for a rear occupant. In the folded up condition thereof the head gas bag 10 extends under the interior vehicle cladding along the A-pillar 20, along the roof frame 30 and along the C-pillar 40. For providing simpler installation of the head gas bag 10 same is arranged in a folded state in a fitting sheath 22 as shown in FIG. 2. The head gas bag 10 does not, however, have to be arranged together with the fitting sheath 22 behind the cladding 32. It is namely possible for the entire lateral impact protective device to be designed as a unit for upgrading an existing vehicle, the fitting sheath 22, as shown in FIG. 2, being attached to the external side of the cladding 32 by means of screws 50. Through openings 36 in the fitting sheath 22 permit access of a screw driver to the attachment screws 50. The screws 50 serve not only for the attachment of the fitting sheath 22 but also for attachment of the edge, which is to the top in the inflated state, of the head gas bag to the vehicle.

In the fitted condition a slot-like outlet opening 34 in the longitudinal direction of the fitting sheath 22 points toward the side window 24 so that the head gas bag 10 spreads out toward the side window 24 in a crash and moves into a position between the occupant's head and the vehicle. The fitting sheath 22 is manufactured of a flexible material, preferably a soft plastic, and possesses an oval, round or any other suitable cross section and may be coated in order to ensure easy outward sliding of the head gas bag 10 in the course of inflation.

At least at one end 12 or 14 of the head gas bag 10 same has a gas inlet opening 16, with which it is connected with a gas generator 60. If, however, gas generators 60 are present at both ends 12 and 14, inflation time for the head gas bag 10 may be reduced.

When there is a lateral impact gas will flow into the interior of the gas bag, something indicated by means of the arrows in FIG. 1, and blows up the head gas bag 10 emerging from the fitting sheath 22. In the event of same being arranged under the cladding 32, the cladding 32 will be ripped open. Owing to inflation the length of the head gas bag 10 will be reduced so that it is drawn taut between its points of attachment arranged in the form of an arc. The necessary shortening of the head gas bag 10 in the longitudinal direction is achieved inter alia by the effect of the elements 38 constricting it in the inflated state, such elements extending transverse to the longitudinal direction thereof. The elements 38 are, as indicated in FIG. 1, in the form of strings, which are attached to the wall of the head gas bag 10 itself and extend in the form of a letter U around the lower edge region 42 of the head gas bag 10 and constrict or strangle it so that the head gas bag 10 is in the form of three cushion-like elements which owing to their outwardly directed convex curvature possess a larger surface area. The elements 38 may be arranged at different positions on the head gas bag 10 so that they play a part in determining the configuration of the inflated head gas bag 10 and its longitudinal shortening during inflation.

The head gas bag 10 tapers toward the lateral ends 12 and 14 thereof so that a gas generator 60 arranged on the A- or C-pillar 20 or 40, respectively, may be concealed to the side of the dashboard or in the back part of the back seat and the dashboard tapered section acts a gas duct.

In the interior of the gas bag a heat resistant polyester foil is provided lying against the internal wall surface of the gas bag in the inflated state, such foil being so arranged and of such a size that it does not have to take up any pulling forces in the inflated state of the head gas bag 10.

Whereas in the first embodiment illustrated in FIG. 1 the top edge of the head gas bag 10 extends along the A-pillar 20, along the roof frame 30 and along the C-pillar 40 and the bottom edge region 42 extends as far as a point adjacent to the bottom end of the side window 24, the head gas bag 10' depicted in FIG. 3 is a sheath-like or hose-like element, which is only secured at its ends 12 and 14 to the vehicle. The head gas bag 10' in accordance with this embodiment is locked on the one hand to the A-pillar 20 and on the other hand to the C-pillar 40 on the vehicle. In the folded up state, as is indicated by broken lines, the head gas bag 10' is concealed under the lateral cladding along the A-pillar 20, and under the roof frame 30 as far as C-pillar 40. Several fabric tapes annularly encircling the sheath-like head gas bag 10' serve as constricting elements 38' causing shortening of the head gas bag 10 during inflation in the longitudinal direction.

I claim:

1. A lateral impact protective device for a front vehicle occupant and a rear vehicle occupant of a vehicle, the vehicle including an A-pillar, a roof frame, and a C-pillar, said lateral impact protective device comprising:

an elongated head gas bag which is convertible from a folded state to an inflated state, said gas bag having two opposite lateral ends and being adapted to extend, in the inflated state, from sidewards of the front vehicle occupant as far as sidewards of the rear vehicle occupant, said gas bag having gas inlet openings at least at one of said lateral ends; and at least one gas generator, said gas generator being attached to at least one of the A-pillar and the C-pillar of the vehicle and being connected via said gas inlet openings with the interior of said gas bag.

2. The lateral impact protective device as claimed in claim 1 wherein said head gas bag extends, in the folded state thereof, along at least a part of the A-pillar, along the roof frame, and along at least a part of the C-pillar of the vehicle.

3. The lateral impact protective device as claimed in claim 2 wherein said head gas bag extends, in the folded state thereof, from the A-pillar as far as the C-pillar of the vehicle.

4. The lateral impact protective device as claimed in claim 2 wherein said head gas bag is attached at one of said lateral ends to the A-pillar and at the other of said lateral ends to the C-pillar.

5. The lateral impact protective device as claimed in claim 3 wherein said head gas bag is attached at one of said lateral ends to the A-pillar and at the other of said lateral ends to the C-pillar.

6. The lateral impact protective device as claimed in claim 2 wherein said head gas bag is attached to the A-pillar, to the roof frame, and to the C-pillar of the vehicle.

7. A lateral impact protective device for a front vehicle occupant and a rear vehicle occupant of a vehicle, said lateral impact protection device comprising:

an elongated head gas bag which is convertible from a folded state to an inflated state, said gas bag having two opposite lateral ends and being adapted to extend, in the inflated state, from sidewards of the front vehicle occupant as far as sidewards of the rear vehicle occupant; and a hose-like fitting sheath in which said head gas bag is arranged in the folded state thereof.

8. The lateral impact protective device as claimed in claim 7 wherein said fitting sheath is secured to the vehicle and said head gas bag is attached to the vehicle along an upper edge.

9. The lateral impact protective device as claimed in claim 7 wherein said fitting sheath has a slot-like outlet opening extending in a longitudinal direction, the vehicle having a side window toward which said outlet opening points.

10. The lateral impact protective device as claimed in claim 7 wherein said fitting sheath is manufactured of flexible material.

11. The lateral impact protective device as claimed in claim 7 wherein said lateral impact protective device is in the form of a unit adapted to be retrofitted to an existing vehicle.

12. The lateral impact protective device as claimed in claim 7 wherein the vehicle includes an A-pillar, a roof frame, and a C-pillar, said head gas bag extending, in the folded state thereof, along at least a part of the A-pillar, along the roof frame, and along at least a part of the C-pillar of the vehicle.

13. The lateral impact protective device as claimed in claim 12 wherein said head gas bag extends, in the folded state thereof, from the A-pillar as far as the C-pillar of the vehicle.

14. The lateral impact protective device as claimed in claim 12 wherein said head gas bag is attached at one of said lateral ends to the A-pillar and at the other of said lateral ends to the C-pillar.

15. The lateral impact protective device as claimed in claim 13 wherein said head gas bag is attached at one of said lateral ends to the A-pillar and at the other of said lateral ends to the C-pillar.

16. The lateral impact protective device as claimed in claim 12 wherein said head gas bag is attached to the A-pillar, to the roof frame, and to the C-pillar of the vehicle.

17. A lateral impact protective device for a front vehicle occupant and a rear vehicle occupant of a vehicle, said lateral impact protection device comprising:

an elongated head gas bag which is convertible from a folded state to an inflated state, said head gas bag having two opposite lateral ends and being adapted to extend in a longitudinal direction, in the inflated state, from a sidewards of the front vehicle occupant as far as sidewards of the rear vehicle occupant;

said head gas bag having at least one element adapted to partially constrict said head gas bag in said inflated state thereof, said element extending transverse to said longitudinal direction and shortening said head gas bag in said longitudinal direction during inflation.

18. The lateral impact protective device as claimed in claim 17 wherein said head gas bag has a wall and said constricting element is secured to said wall and is in the form of a string.

19. The lateral impact protective device as claimed in claim 17 wherein said head gas bag has a wall and said constricting element is secured to said wall and is in the form of a tape.

20. The lateral impact protective device as claimed in claim 17 wherein said gas bag has a bottom edge portion, said constricting element constricting said bottom edge portion in said inflated state of said gas bag.

21. The lateral impact protective device as claimed in claim 17 wherein the vehicle includes an A-pillar, a roof frame, and a C-pillar, said head gas bag extending, in the folded state thereof, along at least a part of the A-pillar, along the roof frame, and along at least a part of the C-pillar of the vehicle.

22. The lateral impact protective device as claimed in claim 21 wherein said head gas bag extends, in the folded state thereof, from the A-pillar as far as the C-pillar of the vehicle.

23. The lateral impact protective device as claimed in claim 21 wherein said head gas bag is attached at one of said lateral ends to the A-pillar and at the other of said lateral ends to the C-pillar.

24. The lateral impact protective device as claimed in claim 22 wherein said head gas bag is attached to one of said lateral ends to the A-pillar and at the other of said lateral ends to the C-pillar.

25. The lateral impact protective device as claimed in claim 21 wherein said head gas bag is attached to the A-pillar, to the roof frame, and to the C-pillar of the vehicle.

26. A lateral impact protective device for a front vehicle occupant and a rear vehicle occupant in a vehicle, the vehicle having side windows with a bottom part, said lateral impact protective device comprising:

an elongated head gas bag which is convertible from a folded state to an inflated state, said gas bag having two opposite lateral ends and being adapted to extend, in the inflated state, from sidewards of the front vehicle occupant as far as sidewards of the rear vehicle occupant;

said head gas bag extending, in the inflated state thereof, as far as the bottom part of the side windows and tapering toward its end.

27. The lateral impact protective device as claimed in claim 26 wherein the vehicle includes an A-pillar, a roof frame, and a C-pillar, said head gas bag extending, in the folded state thereof, along at least a part of the A-pillar, along the roof frame, and along at least a part of the C-pillar of the vehicle.

28. The lateral impact protective device as claimed in claim 27 wherein said head gas bag extends, in the folded state thereof, from the A-pillar as far as the C-pillar of the vehicle.

29. The lateral impact protective device as claimed in claim 27 wherein said head gas bag is attached at one of said lateral ends to the A-pillar and at the other of said lateral ends to the C-pillar.

30. The lateral impact protective device as claimed in claim 28 wherein said head gas bag is attached at one of said lateral ends to the A-pillar and at the other of said lateral ends to the C-pillar.

31. The lateral impact protective device as claimed in claim 27 wherein said head gas bag is attached to the A-pillar, to the roof frames and to the C-pillar of the vehicle.

32. A lateral impact protective device for a front vehicle occupant and a rear vehicle occupant in a vehicle, said lateral impact protection device comprising:

an elongated head gas bag which is convertible from a folded state to an inflated state, said gas bag having two opposite lateral ends and being adapted to extend, in the inflated state, from sidewards of the front vehicle occupant as far as sidewards of the rear vehicle occupant;

said gas bag having an internal wall surface and wherein a heat resistant foil is present in the interior of said gas bag, said foil lying against said internal wall surface and being so arranged and of such a size that it is not loaded by pulling forces in the inflated state of said head gas bag.

33. The lateral impact protective device as claimed in claim 32 wherein the vehicle includes an A-pillar, a roof frame, and a C-pillar, said head gas bag extending in the folded state thereof, along at least a part of the A-pillar, along the roof frame, and along at least a part of the C-pillar of the vehicle.

34. The lateral impact protective device as claimed in claim 33 wherein said head gas bag extends, in the folded state thereof, from the A-pillar as far as the C-pillar of the vehicle.

35. The lateral impact protective device as claimed in claim 33 wherein said head gas bag is attached at one of said lateral ends to the A-pillar and at the other of said lateral ends to the C-pillar.

36. The lateral impact protective device as claimed in claim 34 wherein said head gas bag is attached at one of said lateral ends to the A-pillar and at the other of said lateral ends to the C-pillar.

37. The lateral impact protective device as claimed in claim 33 wherein said head gas bag is attached to the A-pillar, to the roof frame, and to the C-pillar of the vehicle.

* * * * *